(12) United States Patent
Rutsyamuka

(10) Patent No.: US 7,476,992 B2
(45) Date of Patent: Jan. 13, 2009

(54) AIR-COOLED ELECTRIC MOTOR

(75) Inventor: Grace R. Rutsyamuka, Portage, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 378 days.

(21) Appl. No.: 11/383,860

(22) Filed: May 17, 2006

(65) Prior Publication Data
US 2006/0261686 A1 Nov. 23, 2006

Related U.S. Application Data

(60) Provisional application No. 60/681,751, filed on May 17, 2005.

(51) Int. Cl.
H02K 9/00 (2006.01)

(52) U.S. Cl. .......................................... 310/53; 310/89

(58) Field of Classification Search .................. 310/53, 310/58, 59, 62, 63, 64, 52, 89
See application file for complete search history.

(56) References Cited

U.S. PATENT DOCUMENTS

| 3,229,130 | A | * | 1/1966 | Drouard | 310/54 |
| 3,609,420 | A | * | 9/1971 | Inagaki et al. | 310/54 |
| 4,198,191 | A |   | 4/1980 | Pierce | 417/369 |
| 4,425,087 | A |   | 1/1984 | Gould | 417/414 |
| 5,338,995 | A | * | 8/1994 | Takada | 310/89 |
| 5,650,677 | A |   | 7/1997 | Furukawa et al. | 310/88 |
| 5,655,892 | A | * | 8/1997 | Cherniawski et al. | 417/292 |
| 5,894,180 | A |   | 4/1999 | Volz et al. | 310/89 |
| 6,109,891 | A |   | 8/2000 | Sato | 417/423.14 |
| 6,616,425 | B2 |  | 9/2003 | Kober | 417/423.14 |
| 7,191,870 | B2 | * | 3/2007 | Kimura et al. | 184/6.23 |
| 2005/0134126 | A1 | * | 6/2005 | Ibach | 310/62 |
| 2006/0261686 | A1 | * | 11/2006 | Rutsyamuka | 310/53 |

* cited by examiner

Primary Examiner—James Harvey
(74) Attorney, Agent, or Firm—Renner, Otto, Boisselle & Sklar

(57) ABSTRACT

An electric motor (10) wherein the housing (12) comprises a sleeve (42) having a vent opening (110) extending therethrough. The motor cover (22) has a diaphragming portion (140) overlaying the vent opening (110). The diaphragming portion (140) adheres against the sleeve (42) to close the vent opening (110) when pressure within the motor chamber (14) is less than ambient pressure, thereby preventing the passage of air from the chamber (14). The diaphragming portion (140) lifts from the sleeve (42) to open the vent opening (110) when pressure within motor chamber (14) is greater than ambient pressure, thereby allowing the passage of air from the chamber (14).

20 Claims, 8 Drawing Sheets

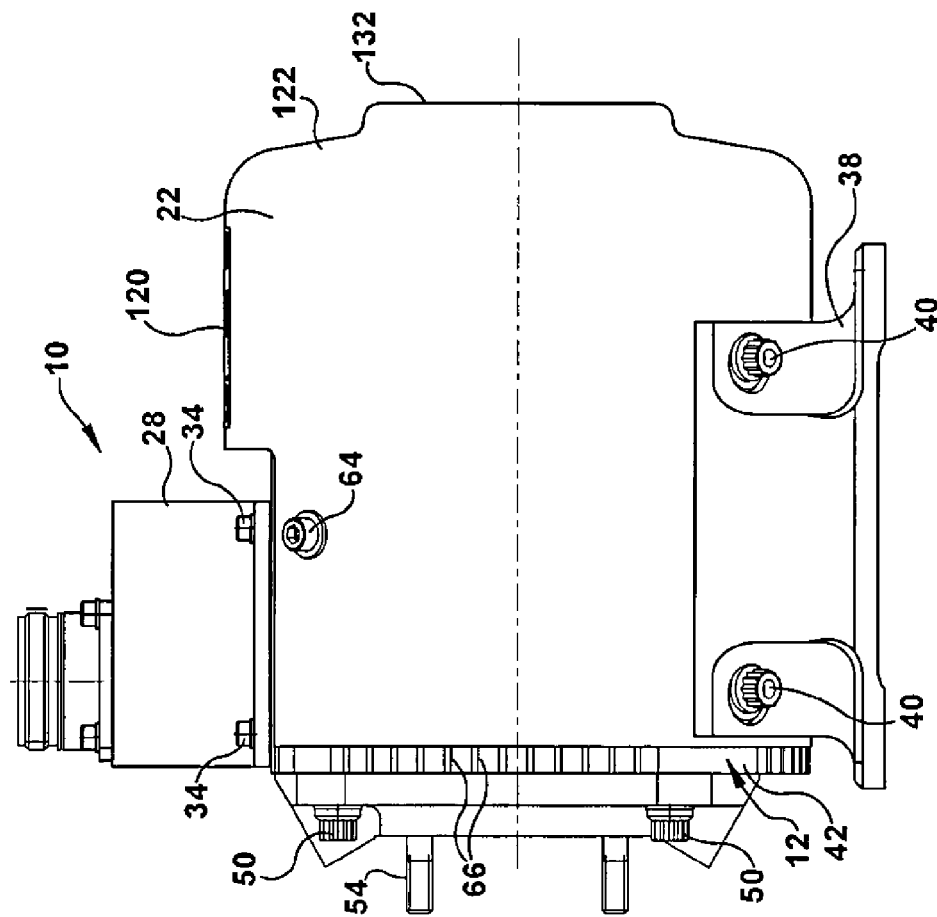
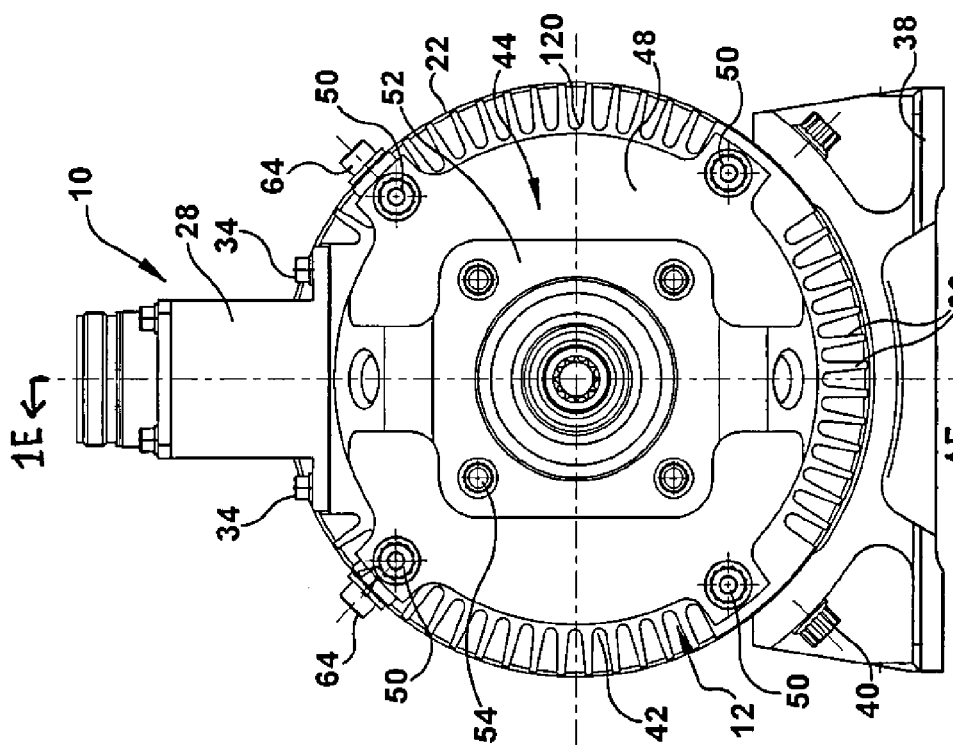
Figure 1A
Figure 1B

AIR-COOLED ELECTRIC MOTOR

RELATED APPLICATION

This application claims priority under 35 U.S.C. §119 (e) to U.S. Provisional Patent Application No. 60/681,751, filed on May 17, 2005. The entire disclosure of this provisional application is hereby incorporated by reference.

FIELD OF THE INVENTION

This invention relates generally to an air-cooled electrical motor which can be used, for example, to drive a hydraulic pump in an aerospace application.

BACKGROUND

An electric motor can comprise a housing defining an essentially air-tight chamber, a stator positioned within the chamber, a rotor for rotation within the stator, a shaft rotating with the rotor and coupled to drive to a component (e.g., a hydraulic pump). In an air-cooled electric motor, the non-drive end of the shaft can have a fan attached thereto and a cover can surround the housing. The fan can be positioned in a cavity between the housing and the cover, and a series of channels can be formed between the housing and the cover. The channels can receive ambient air at the fan-end of the housing and extend axially through the channels to the drive-end of the housing, whereby air can be pushed therethrough by the fan for cooling purposes.

In an aerospace application, the motor will be subjected to a range of ambient pressures depending upon the altitude of the aircraft. For example, the ambient pressure can drop by 60% to 70% at cruise altitudes of 30,000 ft. or higher, and the motor housing must be designed to withstand the mechanical stresses associated with such barometric pressure differentials. This can be accomplished by the motor housing being made of a high strength material (e.g., steel or high strength aluminum alloy) and/or its housing wall being of a sufficient thickness.

SUMMARY

A motor is provided which allows the equalization of pressure inside and outside the motor chamber, thereby eliminating the need for the housing walls to compensate for barometric pressure differentials at high altitudes. The pressure-equalization means can be easily incorporated into existing motor designs and is compatible with air-cooled constructions. No tubes, pipes, or other additional conduits are required to transfer fluid vented from the motor chamber to a desired exhaust area. In most cases, filtering of the vented air will not be necessary.

As pressure differentials are not a significant design consideration for the motor, the housing can be made from a lighter material (e.g., aluminum) and/or have thinner walls. This translates into a weight reduction which, needless to say, is always warmly welcomed by the aerospace industry. Additionally or alternatively, a thinner wall structure facilitates the transfer of heat from the motor chamber to air-cooling channels adjacent to the housing.

More particularly, the electric motor comprises a housing defining a chamber, a stator positioned within the chamber, a rotor for rotation within the stator, a shaft which rotates with the rotor, and a cover surrounding the housing. The housing includes a sleeve having an opening extending therethrough to form a venting passageway from the chamber. The cover closes the vent opening when pressure within the housing is less than or equal to ambient pressure, thereby preventing the passage of air from the motor chamber. The cover lifts from the vent opening when pressure within the housing is greater than ambient pressure, thereby allowing the passage of air from the chamber of the housing.

The cover and the exterior surface of the sleeve can define a series of air-cooling channels which communicate with an outside environment and through which air passes for cooling purposes. For example, the sleeve can comprise a plurality of radial ribs defining recesses therebetween, and the cover can overlay the radially outer ends of the recesses to form the air-cooling channels. When the motor includes air-cooling channels, air vented from the motor chamber (e.g., when the cover lifts from the vent opening because pressure within the chamber is greater than ambient pressure) can pass through one or more of these channels on route to an exhaust cavity.

These and other features of the motor are fully described and particularly pointed out in the claims. The following description and annexed drawings set forth in detail a certain illustrative embodiment of the motor, this embodiment being indicative of but one of the various ways in which the principles of the invention may be employed.

DRAWINGS

FIGS. 1A, 1B, 1C and 1D are front, side, rear and top views, respectively, of the electric motor.

DETAILED DESCRIPTION

Figure 1D:
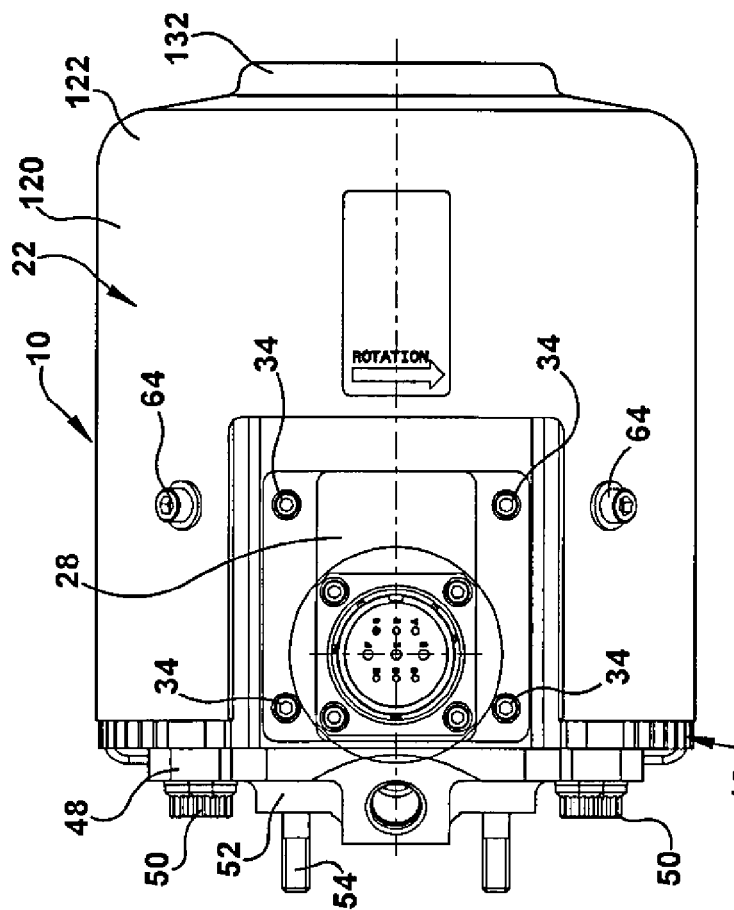
Figure 1C:
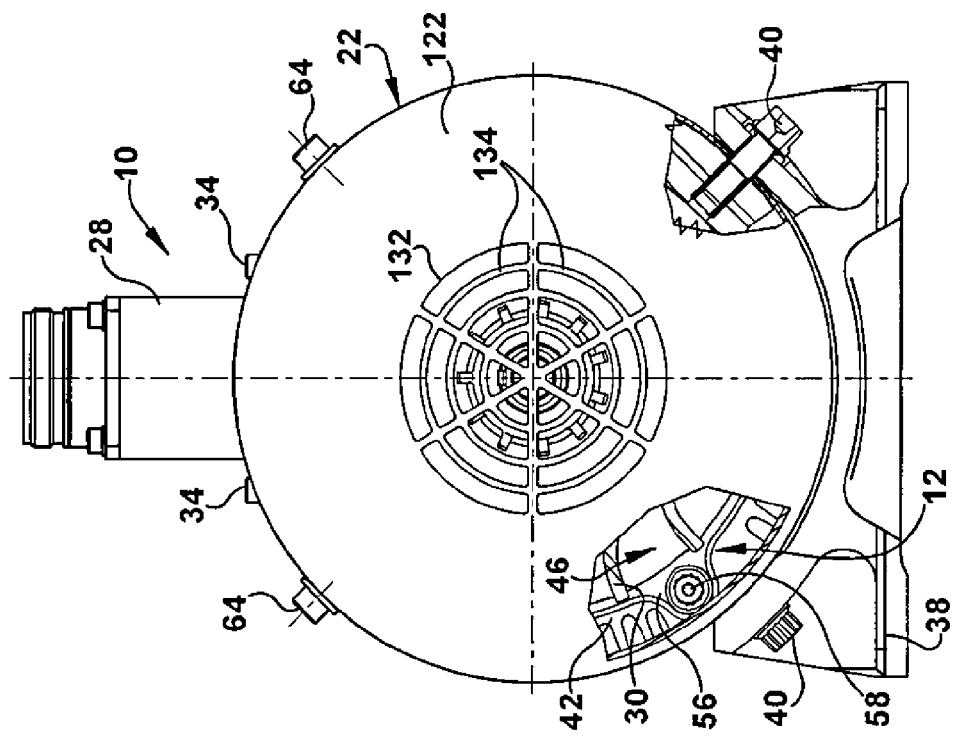
Figure 1E:
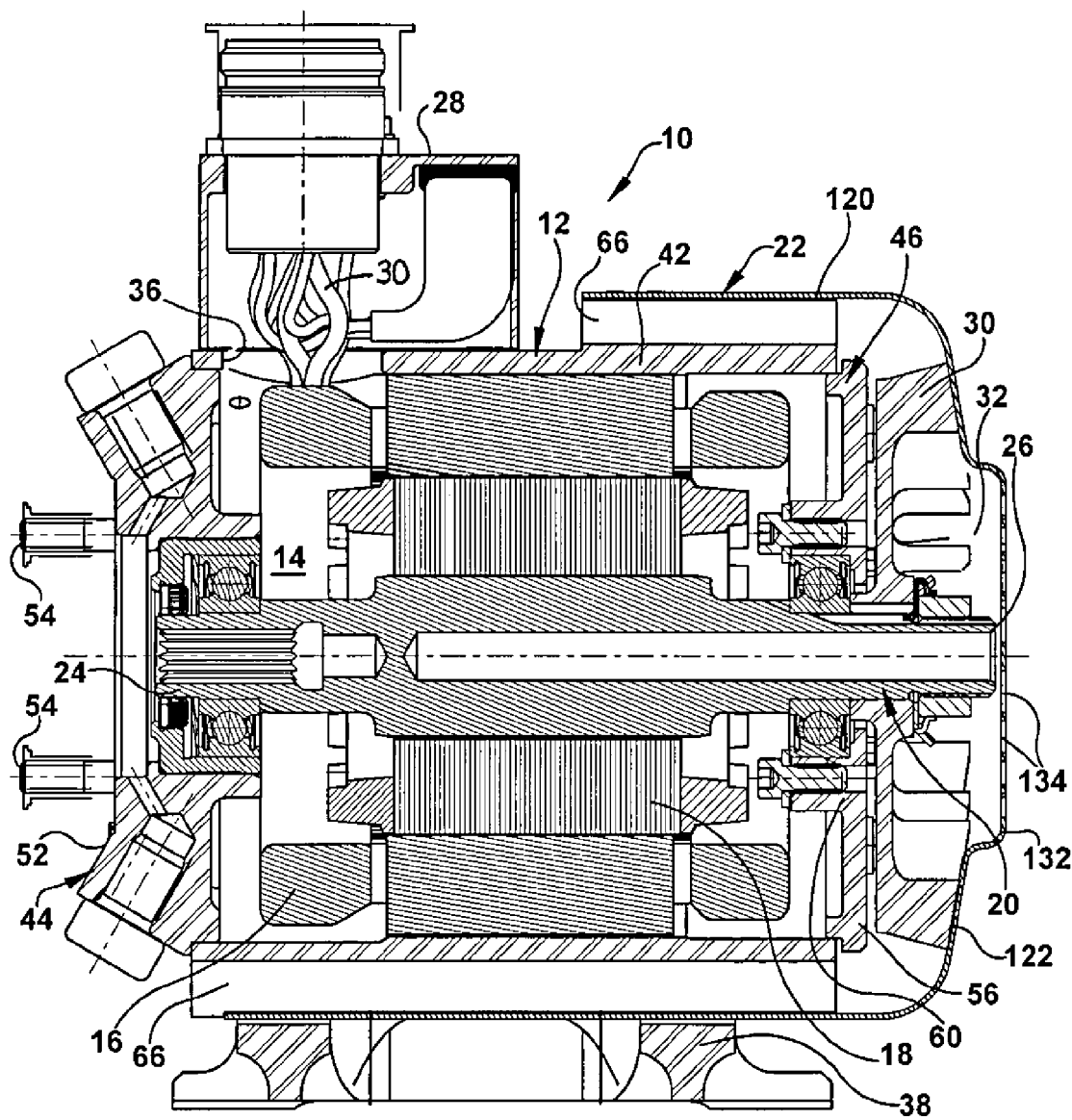
FIG. 1E is a sectional view of the electrical motor as seen along line 1E-1E in FIG. 1A.
Figure 2A:
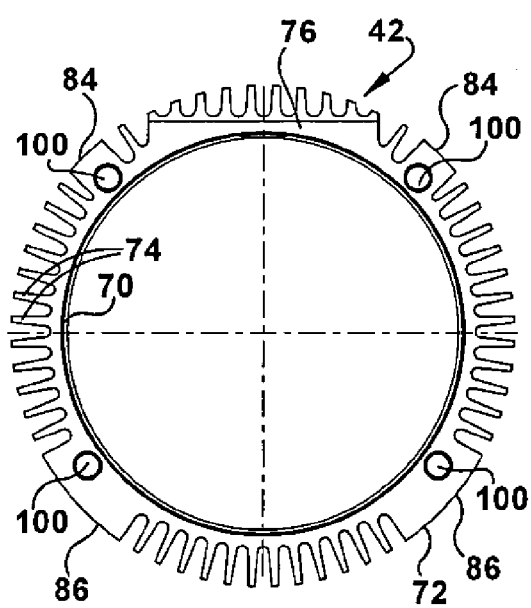
FIGS. 2A, 2B, 2C and 2D are front, side, top and rear views, respectively, of a housing sleeve of the motor.
Figure 2B:
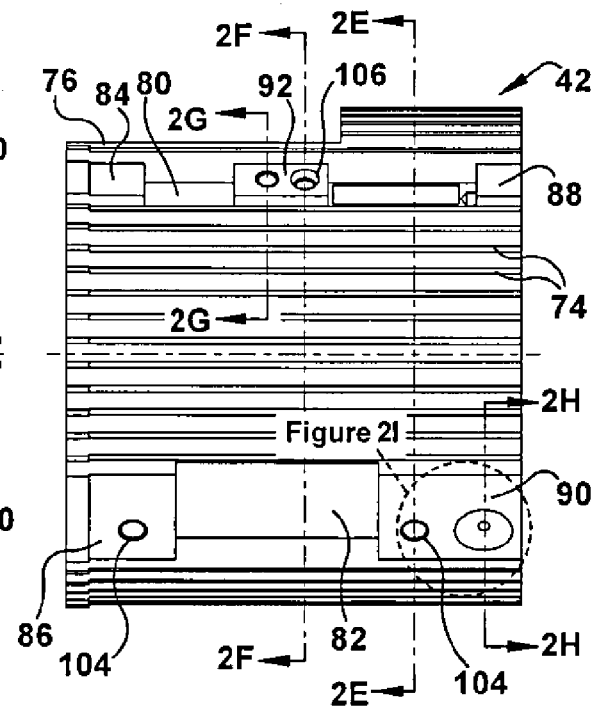
Figure 2C:
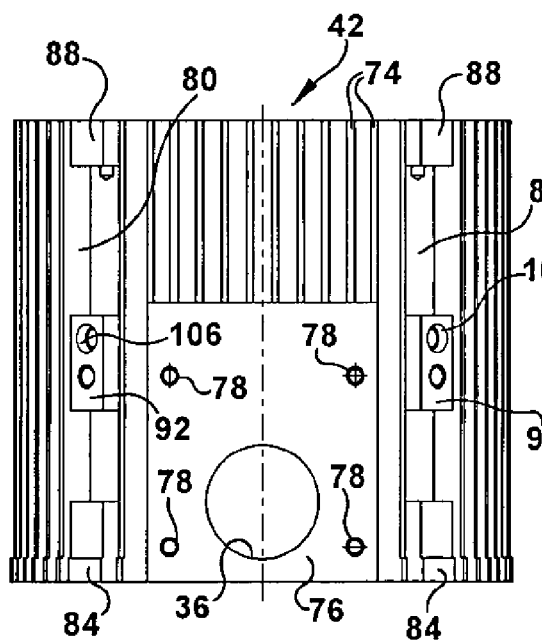
Figure 2D:
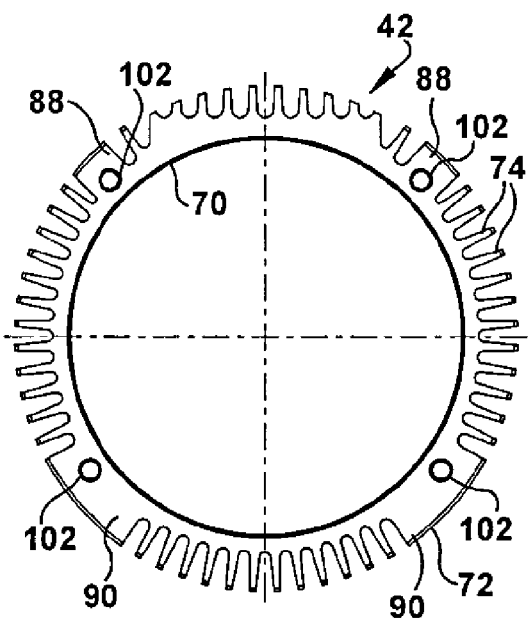
Figures 2E, 2F:
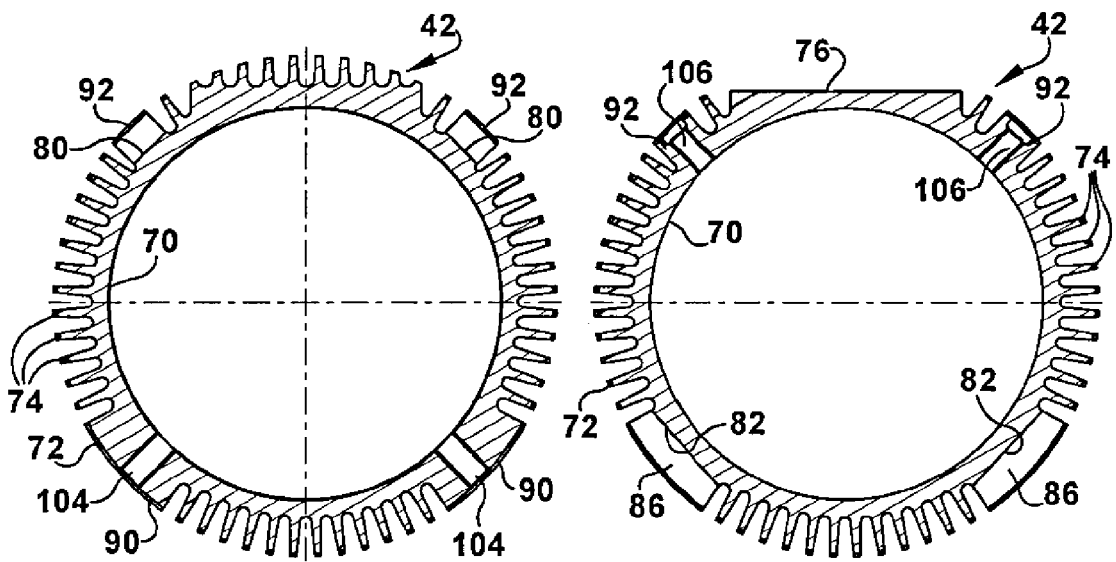
FIGS. 2E, 2F, 2G and 2H are sectional views of the housing sleeve as seen along lines 2E-2E, 2F-2F, 2G-2G and 2H-2H, respectively, in FIG. 2B.
Figure 2G:
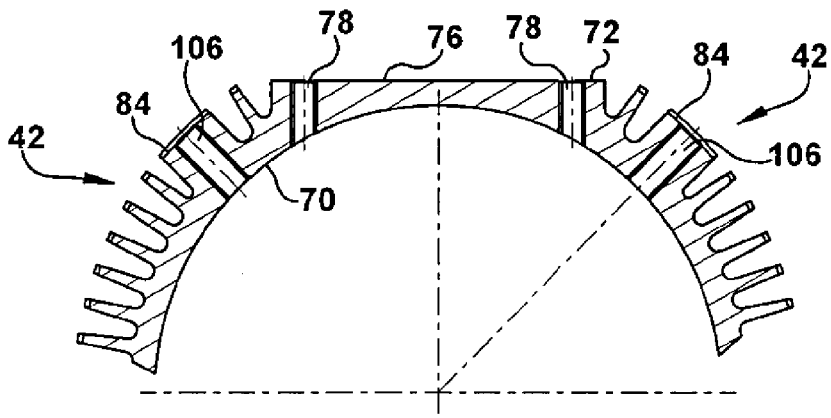
Figure 2H:
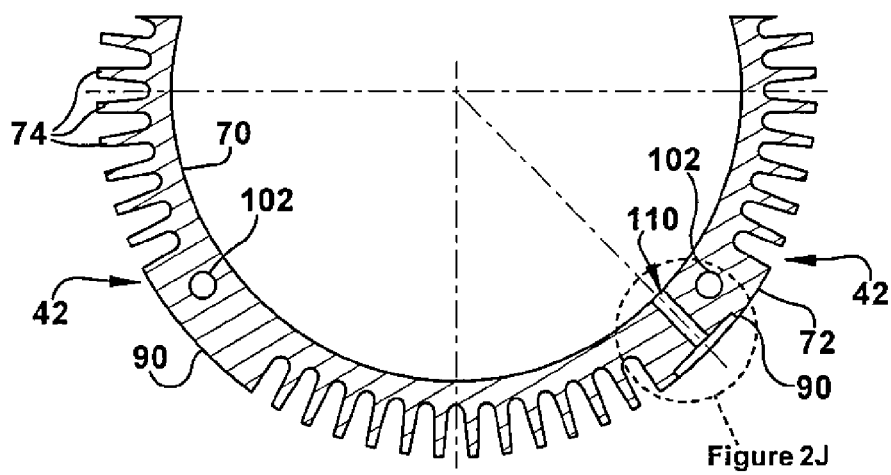
Figure 2I:
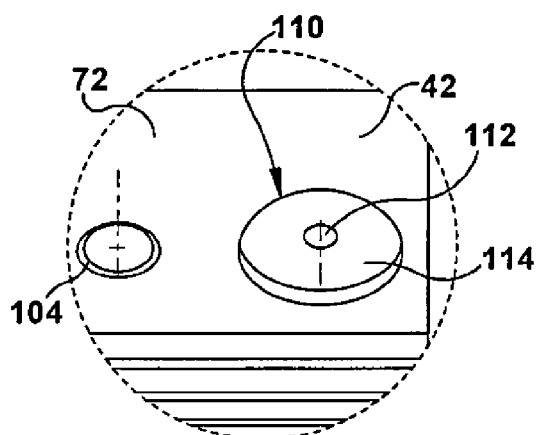
FIG. 2I is a close-up view of a region of FIG. 2B.
Figure 2J:
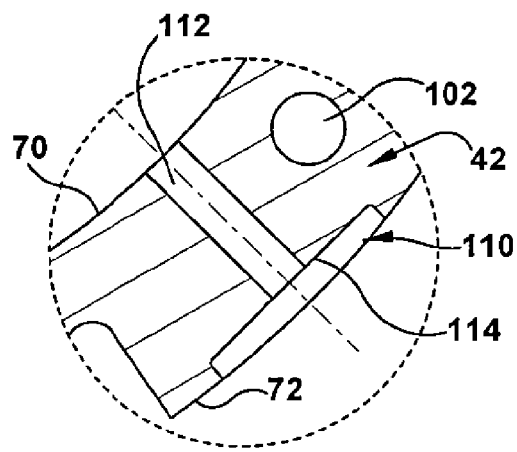
FIG. 2J is a close-up view of a region of FIG. 2H.
Figure 3A:
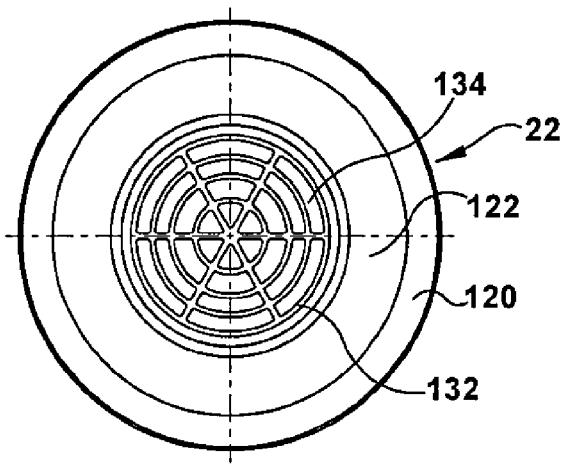
FIGS. 3A, 3B, 3C and 3D are front, side, rear and top views, respectively, of a cover of the motor.
Figure 3B:
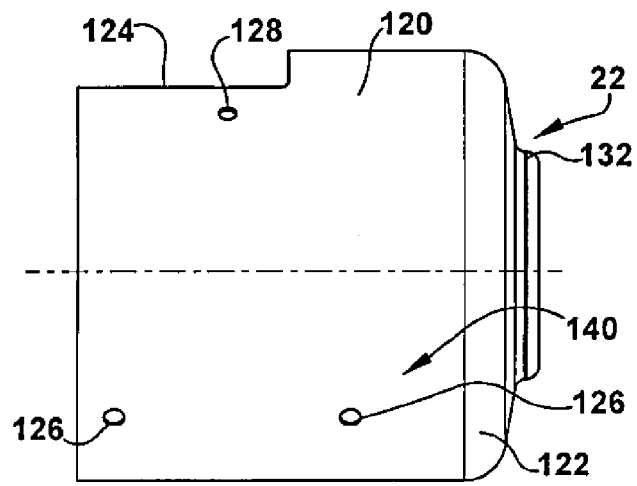
Figure 3C:
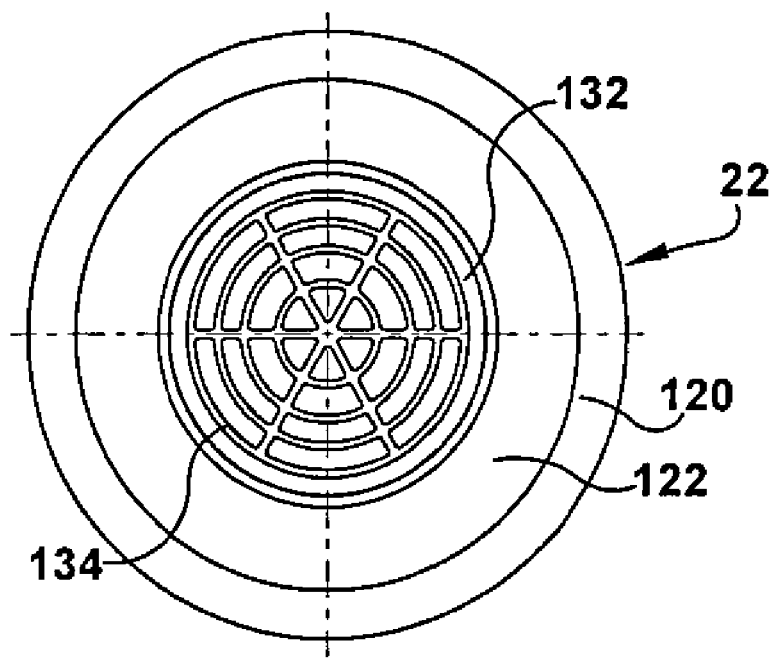
Figure 3D:
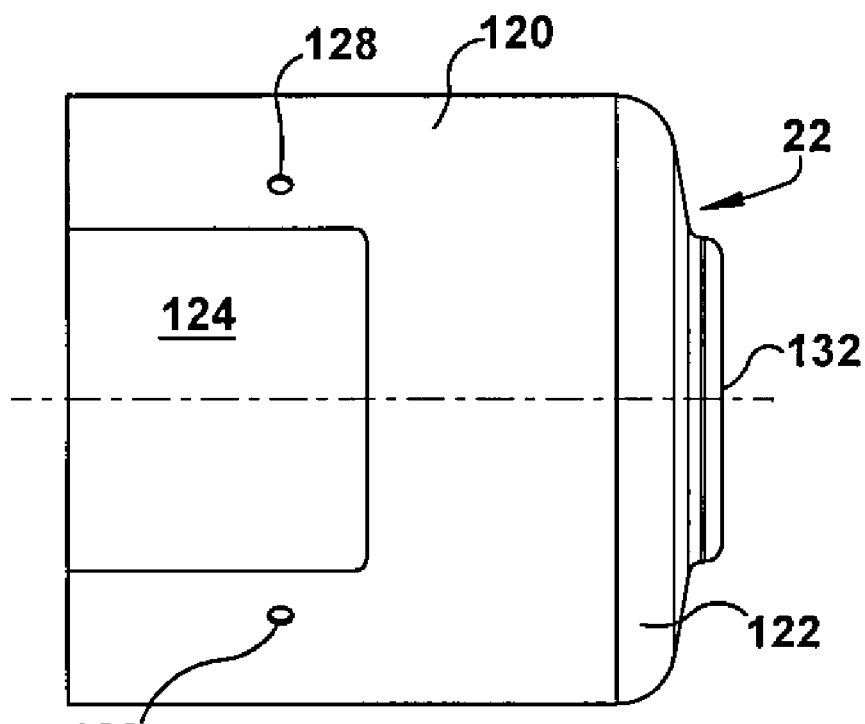

Referring now to the drawings, and initially to FIGS. 1A-1E, an exemplary electric motor 10 is shown. The electric motor 10 comprises a housing 12 defining an air-tight chamber 14, a stator 16 positioned within the chamber 14, a rotor 18 for rotation within the stator 16, a shaft 20 which rotates with the rotor 16, and a cover 22 surrounding the housing 12. The shaft 20 has ends 24 and 26, and the to-be-driven component can be coupled to the front end 24 of the shaft 20. This component can comprise, for example, a hydraulic pump used to control the flow of fluid to aircraft equipment, such as landing gears, wing flaps, etc.

The illustrated motor 10 additionally comprises an electrical tower 28, through which electrical lines 30 extend to the stator 16, and a fan 30 positioned within a rear cavity 34 between the housing 12 and the cover 22. The electrical tower 28 is secured to the housing 12 via four fasteners 34 and electrical lines pass through an access opening 36 in the housing 12. The fan 30 is coupled to the non-drive end 26 of the shaft 20.

The illustrated motor 10 is mounted by a footed bracket 38 to a horizontal surface. Four fasteners 40 extend through the housing 12 and the cover 22 to attach the bracket 38 to the motor 10. While the motor 10 need not be braced in this manner and, in fact, need not be horizontally oriented, some type of bracket system will usually be employed for mounting purposes. In either or any event, some type of fasteners will usually extend through the housing 12 to accomplish the desired mounting arrangement.

The housing 12 comprises a cylindrical sleeve 42, a closure 44 for the drive-end of the sleeve 42, and a closure 46 for the fan-end of the sleeve 42. The closure 44 can comprise, for example, a plate 48 secured to the drive-end edge of the sleeve 42 by four fasteners 50. The plate 48 has an end bell from which fasteners 54 project for enabling attachment of a driven component, such as a pump, to the motor. The closure 46 can comprise, for example, a plate 56 secured to the fan-end edge of the sleeve 42 by four fasteners 58 (only one visible in the drawings) and an end bell 60. Although not specifically shown and/or numbered in the drawings, the closures 44 and 46 each have a central shaft opening, and appropriate bearings and seals are provided to accommodate the extension of the shaft 20 therethrough.

The cover 22 is attached to the housing 12 via two fasteners 64 on an upper area of the sleeve 42 surrounding the electrical tower 28. The cover 22 and the sleeve 42 form air-cooling channels 66 therebetween which extend axially from the drive-end of the housing 12 to the fan-end of the housing 12. At the drive-end, the channels 66 are open to receive ambient air and, at the fan-end, the channels 66 flow into the fan cavity 32. Rotation of the fan 30 (via rotation of the shaft 20 during operation of the motor 10) pushes air through the channels 66 from the cavity 32 whereat it sucked through slots (namely intake slots 134, introduced below), in the cover 22. As will be appreciated, the fan may be reversely operated to effect flow in the opposite direction if desired.

Referring now to FIG. 2A-2J, the housing sleeve 42 is shown in detail. The sleeve 42 has an interior side 70 adjacent the motor chamber 14 and an exterior side 72 adjacent the cover 22. The interior side 70 has a relatively smooth cylindrical shape. The sleeve's exterior side 72 includes a plurality of radial ribs 74 and a flat shelf 76 in an upper front area. The shelf 76 is the mounting surface of the electrical tower 28, whereby it includes the electrical line access opening 36. Four openings 78 are provided on the shelf 76 for receipt of the tower-to-housing fasteners 34.

Except for the radial ribs 74 axially aligned with the shelf 76, the radial ribs 74 each extend axially from the drive-end of the sleeve 42 to the fan-end of the sleeve 42. The shelf-aligned ribs 74 extend from the rear edge of the shelf 76 to the fan-end of the sleeve 42. The ribs 74 define recesses therebetween and, when the cover 22 overlays the ribs 74 in the assembled motor 10, these recesses form the air-cooling channels 66.

The ribs 74 are spaced around the entire circumference of the sleeve 42, with interruptions being formed by two top ledges 80 and two bottom ledges 82. In the illustrated embodiment, the ledges 80/82 are positioned approximately 90° apart, with each ledge 80/82 being offset roughly 45° from a horizontal line. A platform 84 is provided at/near the front of each top ledge 80, a platform 86 is provided at/near the front edge of each bottom ledge 82, a platform 88 is provided at/near the rear edge of top ledge 80, a platform 90 is provided at/near the rear edge of each bottom ledge 82, and a platform 92 is provided in a central area of each top ledge 80.

The platforms 84 and 86 each include an opening 100 on their front axial faces for receipt of the plate-to-sleeve fasteners 50. The platforms 88 and 90 each include an opening 102 on their rear axial faces for receipt of the plate-to-sleeve fasteners 62. The platforms 86 and 90 each also include an opening 104 on their radially outer faces for receipt of the bracket fasteners 40. The central platforms 92 each include an opening 106 for receipt of the respective cover-to-sleeve fastener 64 and another opening (shown but not numbered) for receipt of another fastener to secure an housing-interior component (e.g., the stator 16) to the housing 12.

The sleeve 42 further comprises a vent opening 110 extending therethrough (i.e., from its interior side 70 to its exterior side 72). (See FIGS. 2B and 2H.) The vent opening 110 has a relatively thin stem 112 extending radially outward from the sleeve's interior side 70 and a wider pocket 114 formed on its exterior side 72. (See FIGS. 2I and 2H.) In the illustrated embodiment, the vent opening 110 extends through one of the bottom/rear platforms 90. It is circumferentially offset from the opening 102 (for the plate-to-sleeve fasteners 62) and axially offset from the opening 104 (for the bracket fastener 40).

The vent opening 110, in conjunction with the cover 22, provides an air passage when the pressure in the chamber 14 is greater than the ambient pressure thereby compensating for barometric pressure differentials at high altitudes. Thus, sleeve 42 (and also other parts of the housing 12 and/or motor 10) can be made from a light metal, such as aluminum. Even when made of aluminum, the wall thickness of the sleeve 42 can be relatively thin. For example, the radial thickness of the ribs 74, and the platforms 88, 90, and 92 can be between 0.5 and 0.6 inches, and the "non-ribbed" base portion can be less than 30% of this thickness, less than 20% of this thickness, and/or less than 10% of this thickness (e.g., less than 0.18 inches, less than 0.12 inches, less than 0.10 inches, less than 0.06 inches, less than 0.05 inches). This wall thinness not only contributes to weight reduction, but also facilitates heat transfer from the chamber 14 to the air-cooling channels 66.

In the preferred and illustrated embodiment, the sleeve 42 (e.g., the ribs 74, the platforms 88, 90, 92, etc.) is formed in one piece. However, in some cases, it may be advantageous to attach the platforms 88, the platforms 90, and/or the platforms 92 after formation of the sleeve 42. Additionally or alternatively, the ribs 74 could instead be formed integrally with the cover 22 or could, in fact, be formed from a separate part (or parts) positioned between the housing 12 and the cover 22.

Turning now to FIGS. 3A-3D, the cover 22 is shown in detail. The cover 22 comprises a generally cylindrical side wall 120 and a rear wall 122. The cover 22 can be made of a very thin light metal, such as aluminum, as is common in air-cooled motors. The thickness of the walls 120/122 can be, for example, from about 0.01 to about 0.1 inches and more preferably from about 0.02 to about 0.06 inches.

The side wall 120 has a cut-out 124 for the electrical tower 28, openings 126 for the bracket fasteners 40, and openings 128 for the cover-to-sleeve fasteners 64. The side wall 120 is sized/shaped to closely surround the ribs 74 so as to form the air-cooling channels 66. That being said, the attachment of the cover 22 to the sleeve 42 is such that a limited amount of radial movement is possible. The rear wall 122 is positioned relative to the end closure 46 to form the fan cavity 32 and it has a central protrusion 132 with intake slots 134.

Figure 4A:
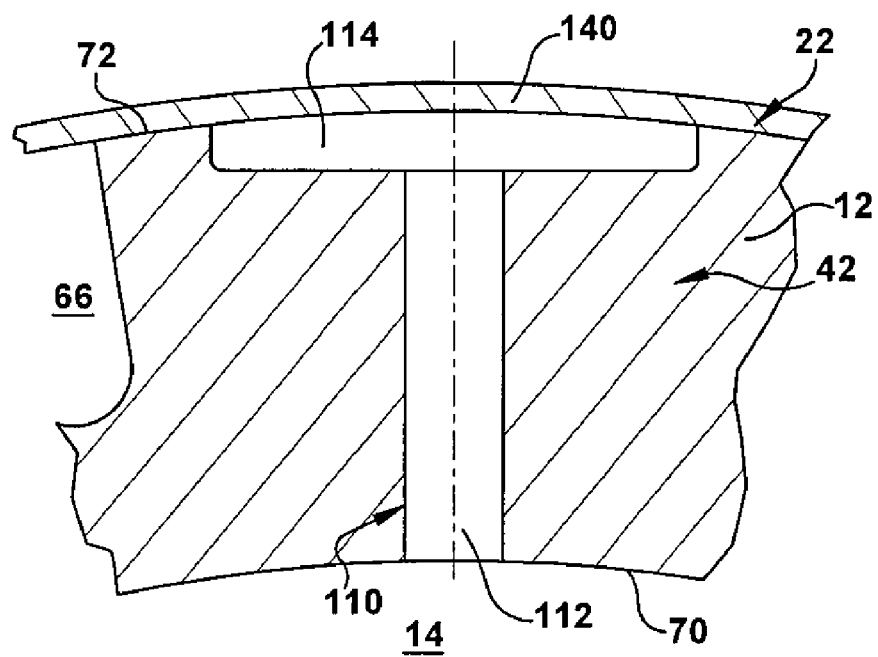
FIGS. 4A and 4B are schematic views of regions of the housing and the cover in a non-venting condition and a venting condition, respectively.
Figure 4B:
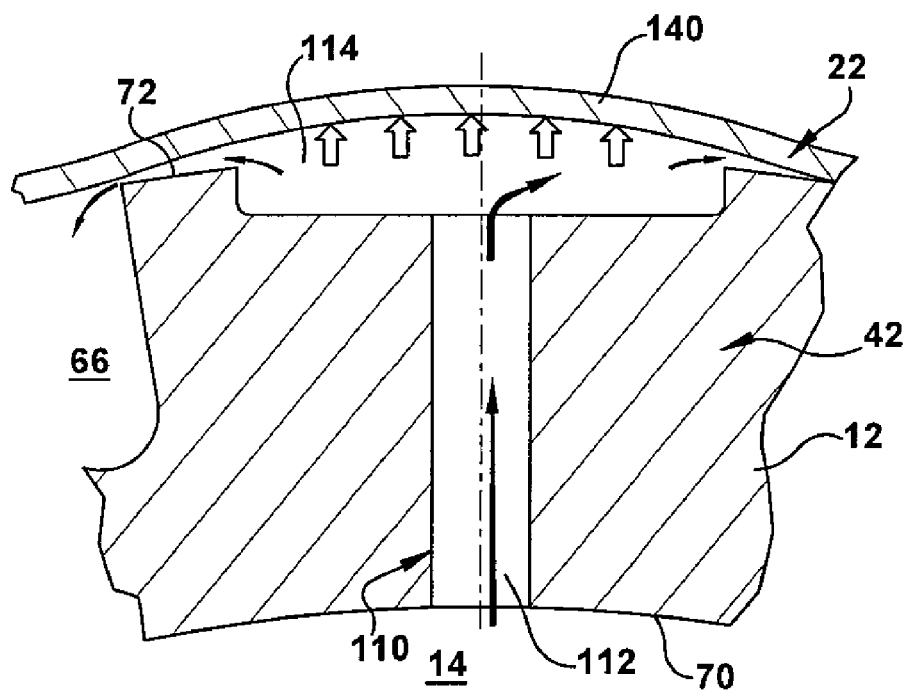

The cover 22 includes a diaphragming portion 140 which overlays the pocket 114 of the vent opening 110. As was indicated above, a limited amount of radial movement is possible between the cover 22 and the sleeve 42. As is shown schematically in FIGS. 4A and 4B, the diaphragming portion 140 closes/opens the vent opening 110 in response to barometric pressure differentials. Specifically, when pressure within the motor chamber 14 is less than ambient pressure, the diaphragming portion 140 is drawn inward. The portion 140 adheres against the exterior side 72 of the sleeve 42 thereby closing the vent opening 110 and preventing passage of air from chamber 14. (FIG. 4A.) When pressure within the motor chamber 14 is greater than ambient pressure, the diaphragming portion 140 lifts from the sleeve 42 to open the vent opening 110, thereby allowing the passage of air from the chamber 14. (FIG. 4B.) The vented air can then join a stream of cooling air as it flows to the fan cavity 32 for exhaust from the motor 10.

The size/shape of the vent opening 110, and particularly its stem 112 and its pocket 114, can be selected to provide the desired venting rate. The flow area of the stem 112 (e.g., its diameter) will largely dictate the flow rate during venting situation. For example, the cross-sectional area of the stem 112 can be less than 2%, less than 1%, less than 0.5%, and/or less than 0.05% the cross-sectional area of the chamber 14. Thus, if the diameter of the chamber 14 is between 5 inches and 6 inches, the diameter of the stem 112 (if circular) can be between 0.1 inches and 0.9 inches.

The volume of the pocket 114 (e.g., its cross-sectional area and depth) can be chosen to insure that a sufficient "lifting" and a sufficient "pulling" force are provided to the diaphragming portion 140 of the cover 22 to open and close the vent, respectively. The cross-sectional area of the pocket 114 can be twice, three times, and/or four times as great as the cross-sectional area of the stem 112, and the pocket depth can be less than 30%, less than 20%, less than 10%, and/or less than 5% the radial thickness of the region of the sleeve 42 through which it extends. For example, if the diameter of the stem 112 is between 0.1 inches and 0.9 inches, the diameter of the pocket 114 (if circular) can be between 0.2 inches and 0.4 inches. If the radial thickness of the platform 90 is between 0.5 inches and 0.6 inches, the pocket depth can be between 0.20 inches and 0.02 inches.

The opening 110 can be placed relative to the housing sleeve 42 so as to allow the diaphragming portion 140 of the cover 22 to adequately adhere to, and lift from, the pocket 114. More than one vent opening 110 can be provided and, if so, the placement of the respective openings 110 can be such that they are not competing/interfering with each other during sealing and/or lifting. In the illustrated embodiment, the vent opening 110 is located in a lower region of the housing 22 so that, in some situations, it can double as a drain for condensation, but such a downward placement is not necessary.

One may now appreciate that a motor 10 is provided which allows the equalization of pressure inside and outside the motor chamber 14, thereby eliminating the need for heavy housing walls to compensate for barometric pressure differentials at high altitudes. Thus, the motor housing 12 can be made from lighter materials (e.g., aluminum), a significant advantage in aerospace applications. Additionally or alternatively, the pressure-equalization means can be easily incorporated into existing motor designs by adding an appropriate vent opening 110. The cover 22 itself can function as the diaphragming portion 140 thereby eliminating the need for any additional parts and/or no extra tubing or piping is necessary to convey vented air to a desired location. The simplicity of the venting arrangement eases construction and/or maintenance, and is compatible with air-cooled motor designs as there are no protruding parts to interfere with air streams.

Although the invention has been shown and described with respect to a certain embodiment or embodiments, it is obvious that equivalent alterations and modifications will occur to others skilled in the art upon the reading and understanding of this specification and the annexed drawings. In regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electric motor comprising a housing defining a chamber, a stator positioned within the chamber, a rotor for rotation within the stator, a shaft which rotates with the stator, and a cover surrounding the housing;
   the housing comprising a sleeve having an interior side adjacent the chamber, an exterior side adjacent the cover, and a vent opening extending therethrough;
   the cover having a diaphragming portion overlaying the vent opening;
   the diaphragming portion adhering against the sleeve to plug the vent opening when pressure within the chamber is less than ambient pressure, thereby preventing the passage of air from the chamber; and
   the diaphragming portion lifting from the sleeve to unplug the vent opening when pressure within chamber is greater than ambient pressure, thereby allowing the passage of air from the chamber.

2. An electric motor as set forth in claim 1, wherein the cover comprises a cylindrical wall and wherein the diaphragming portion is formed in one piece with the cylindrical wall.

3. An electric motor as set forth in claim 1, wherein air-cooling channels are positioned between the sleeve and the cover.

4. An electric motor as set forth in claim 3, wherein the exterior side of the sleeve comprises a plurality of radial ribs defining recesses therebetween, and wherein the cover overlies the ribs whereby the recesses form the air-cooling channels.

5. An electric motor as set forth in claim 1, further comprising a fan attached to one end of the shaft for rotation therewith.

6. An electric motor as set forth in claim 5, wherein the cover and the housing form a cavity for the fan.

7. An electric motor as set forth in claim 1, wherein the vent opening has a stem portion extending radially outward from the interior side of the sleeve and a pocket portion positioned on the exterior side of the sleeve.

8. An electric motor as set forth in claim 7, wherein the cross-sectional area of the stem is less than 2% of the cross-sectional area of the chamber.

9. An electric motor as set forth in claim 8, wherein the cross-sectional area of the pocket is twice as great as the cross-sectional area of the stem.

10. An electric motor as set forth in claim 9, wherein the pocket has a depth less than 30% the radial thickness of the region of the sleeve through which it extends.

11. An electric motor as set forth in claim 7, wherein the pocket has a depth less than 30% the radial thickness of the region of the sleeve through which it extends.

12. An electric motor as set forth in claim 1, wherein the housing is made of aluminum.

13. An electric motor as set forth in claim 12, wherein the cover is made of aluminum.

14. An electric motor as set forth in claim 1 wherein:
the cover comprises a cylindrical wall and the diaphragming portion is formed in one piece with the cylindrical wall;
the sleeve and the cylindrical wall of the cover form air-cooling channels therebetween;
a sleeve-end closure of the housing and an end wall of the cover form a fan cavity therebetween;
a fan is attached to the non-drive end of the shaft for rotation therewith and is positioned within the fan cavity; and
the air-cooling channels travel to the fan cavity and air passing through the vent opening flows to one or more of the air-cooling channels.

15. An electric motor as set forth in claim 1, wherein the housing is made of aluminum.

16. An electric motor as set forth in claim 12, wherein the cover is made of aluminum.

17. A motor housing sleeve comprising an interior side and an exterior side defining a radial thickness;
the interior side defining a chamber;
the exterior side having a series of axially-extending radial ribs with recesses therebetween for forming air-cooling channels; and
a vent opening extending through the radial thickness;
wherein the exterior side also has platforms having the same radial thickness as the ribs and wherein the vent opening extends through one of these platforms.

18. A motor housing sleeve, comprising an interior side and an exterior side defining a radial thickness;
the interior side defining a chamber:
the exterior side having a series of axially-extending radial ribs with recesses therebetween for forming air-cooling channels; and
a vent opening extending through the radial thickness,
wherein the vent opening has a stem portion extending radially outward from the interior side of the sleeve and a pocket portion positioned on the exterior side of the sleeve.

19. A motor housing sleeve as set forth in claim 18, wherein the cross-sectional area of the stem is less than 10% of the cross-sectional area of the chamber, the cross-sectional area of the pocket is twice as great as the cross-sectional area of the stem, and the depth of the pocket is less than 30% the radial thickness of the region of the sleeve through which it extends.

20. A motor housing sleeve as set forth in claim 19, wherein the sleeve is made of aluminum.

* * * * *